(12) United States Patent
Nguyen

(10) Patent No.: US 6,380,520 B1
(45) Date of Patent: Apr. 30, 2002

(54) TOASTER WITH IMPROVED SAFETY DEVICE

(75) Inventor: Nhiem Viet Nguyen, Glen Allen, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 0 days.

(21) Appl. No.: 09/888,367

(22) Filed: Jun. 22, 2001

Related U.S. Application Data

(60) Provisional application No. 60/243,066, filed on Oct. 25, 2000.

(51) Int. Cl.$^7$ .................................................. A47J 37/08
(52) U.S. Cl. .......................... 219/392; 219/413; 99/327; 99/338
(58) Field of Search .................. 219/392, 412–414, 219/385, 386; 99/327, 332, 337, 338

(56) References Cited

U.S. PATENT DOCUMENTS

| | | |
|---|---|---|
| 1,926,276 A | 9/1933 | Forbes |
| 1,967,209 A | 7/1934 | Lawrence |
| 1,979,845 A | 11/1934 | Schallis |
| 2,251,925 A | 8/1941 | Edmunds et al. |
| 2,387,817 A | 10/1945 | Wales |
| 2,553,593 A | 5/1951 | Lermont |
| 2,562,535 A | 7/1951 | Leonard |
| 2,631,523 A | 3/1953 | Olving |
| 2,877,702 A | 3/1959 | Turner |
| 2,913,976 A | 11/1959 | Cole |
| 3,361,053 A | 1/1968 | Jepson et al. |
| 3,869,970 A | 3/1975 | Eagle |
| 4,188,865 A | 2/1980 | Bjarsch |
| 4,216,372 A | 8/1980 | Huggler |
| 4,345,513 A | 8/1982 | Holt |
| 4,395,621 A | 7/1983 | Parker |
| 4,510,376 A | 4/1985 | Schneider |
| 4,518,849 A | 5/1985 | Rolland |
| 4,972,768 A | 11/1990 | San Juan |
| 5,018,437 A | 5/1991 | San Juan |
| 5,085,136 A | 2/1992 | Eisenberg |
| 5,094,154 A | 3/1992 | Nopanen |
| 5,097,751 A | 3/1992 | Eisenberg et al. |
| 5,121,678 A | 6/1992 | Del Fresno |
| 5,283,421 A * | 2/1994 | Richards ...................... 99/327 |
| 5,304,782 A | 4/1994 | McNair et al. |
| 5,385,082 A | 1/1995 | Huggler et al. |

(List continued on next page.)

FOREIGN PATENT DOCUMENTS

DE      19606507    * 8/1997

*Primary Examiner*—Joseph Pelham
(74) *Attorney, Agent, or Firm*—Akin, Gump, Strauss, Hauer & Feld, L.L.P.

(57) ABSTRACT

A safety shut-off device for an electric toaster having a food support member includes at least one switch that is movable between a closed position to thereby energize one or more heating elements associated with the toaster and an open position for deenergizing the at least one heating element. A rotatable support beam is pivotally connected to the chassis. An armature is connected to one end of the beam and a first locking member is connected to an opposite end of the beam. A second locking member associated with the food support member engages the first locking member during a toasting operation. During a toasting operation, the beam is rotated to close the at least one switch and an electromagnet is energized to hold the beam, and thus the food support member, in a toasting position. At the end of the toasting operation, the electromagnet is deenergized, causing the beam to rotate and open the switch to deenergize the at least one heating element and release the food support member. Rotation of the beam to open the switch and deenergize of the at least one heating element is independent of movement or non-movement of the food support member. In this manner, the toaster does not continue to operate in the event of a food jam.

28 Claims, 6 Drawing Sheets

U.S. PATENT DOCUMENTS

| | | |
|---|---|---|
| 5,522,306 A | 6/1996 | DeMars |
| 5,642,657 A | 7/1997 | Yeung et al. |
| 5,644,974 A | 7/1997 | Slavin |
| 5,653,158 A | 8/1997 | Balandier et al. |
| 5,664,481 A | 9/1997 | Huggler |
| 5,664,483 A | 9/1997 | Yip |
| 5,705,791 A | 1/1998 | Sutton et al. |
| 5,901,639 A | 5/1999 | Huggler |
| 5,918,532 A | 7/1999 | Arnedo et al. |
| 6,014,925 A | 1/2000 | Basora et al. |
| 6,104,001 A | 8/2000 | Huggler |
| 6,112,648 A | 9/2000 | Origane |
| 6,123,012 A | 9/2000 | Hardin et al. |
| 6,129,007 A | 10/2000 | Chan et al. |
| 6,230,611 B1 * | 5/2001 | Mauffrey ..................... 99/327 |
| 6,298,772 B1 * | 10/2001 | Nguyen et al. ............... 99/327 |

* cited by examiner

TOASTER WITH IMPROVED SAFETY DEVICE

CROSS REFERENCE TO RELATED APPLICATION

This application is a non-provisional application of co-pending U.S. Provisional Patent Application Ser. No. 60/243,066, filed Oct. 25, 2000.

BACKGROUND OF THE INVENTION

This invention relates to electric toasters, and more particularly to an improved safety device for an electric toaster for arresting operation of the toaster in the event of a jammed food item.

Household toasters commonly have a control chamber separated from a toasting chamber by a vertical end wall. A bread carriage plate is slidably received on a support post in the control chamber and carries a pair of bread lifters that extend into the toasting chamber between heating elements. The carriage plate and bread lifters are vertically movable between a raised position for loading bread or other food items onto the bread lifters and a lowered position for toasting the bread or other food items.

Some toasters have only one bread lifter while other toasters have two or more bread lifters. For the purpose of discussion, this invention is disclosed for use in a toaster configuration comprising two bread lifters, which is currently the most common. However, as will become apparent, aspects of this invention described below can be used in other toaster configurations.

In many toasters, the bread lifters are connected to a vertically movable support carriage. A coil spring biases the support carriage upwardly so that the bread lifters are normally in an upper, non-toasting position. The support carriage can be lowered to the toasting position by manipulation of a control lever accessible from outside the toaster housing. During a toasting cycle, a latch mechanism holds the support carriage and thus the bread lifters in a lowered, toasting position. User-adjustable electric means controls the toasting cycle times during which the bread lifters are latched in the toasting position in order to toast the food items to a desired color.

Some toasters include a lost-motion safety device wherein the bread is lowered by the support carriage onto holding tabs that extend from a sheet metal base of the toaster. The tabs are formed by stamping U-shaped slots in the sheet metal base then bending the tabs to form cantilevered supports. Once the bread is supported on the holding tabs, the support carriage can continue to descend until locked or latched in a toasting position, whereupon heating elements are energized to toast the bread. Should the bread become lodged at the end of a heating cycle, the support carriage will move upward to de-energize the heating elements before it contacts the bread to thereby stop the toasting cycle before the bread reaches an unpleasant state.

There is a continuous need to improve toaster mechanisms and their method of manufacture to realize further cost savings while maintaining safety standards. Accordingly, it would be advantageous to provide a toaster with an improved safety device that does not rely on lost motion mechanisms for stopping the toasting cycle in the event of a food jam.

SUMMARY OF THE INVENTION

According to the invention, an electric toaster comprises a chassis with at least one toasting compartment. At least one heating element is located in the compartment and a food support member is positioned in the compartment for supporting a food item. The food support member is biased toward an upper rest position and is movable between a lower toasting position and the upper rest position. An electromagnet is connected to the chassis for holding the food support member in the lower toasting position when energized. At least one switch is movable between a closed position to thereby energize the at least one heating element and an open position for deenergizing the at least one heating element. A rotatable support beam is pivotally connected to the chassis for pivotal movement between a first pivot position wherein the rotatable support beam moves the switch to the closed position and a second pivot position wherein the switch is in the open position. An armature is connected at a first end of the rotatable support beam for pivotal movement with the rotatable support beam between the first and second pivot positions. The armature is held by the electromagnet in the first pivot position when the electromagnet is energized and is separated from the electromagnet in the second pivot position when the electromagnet is deenergized. A first locking member is located at a second end of the rotatable support beam opposite the first end. A second locking member is operably connected to the food support member for movement therewith. In this manner, the first and second locking members interengage and the rotatable support beam is pivoted toward the first pivot position when the food support member is moved toward the lower toasting position to thereby close the switch and energize the at least one heating element. Upon energization of the electromagnet, the food support member is held against movement in the lower toasting position. Upon deenergization of the electromagnet, the rotatable support beam pivots to the second pivot position to disengage the first and second locking members and open the switch to deenergize the at least one heating element independent of movement or non-movement of the food support member.

Further according to the invention, safety shut-off device is provided for an electric toaster having a food support rod movable in a toasting chamber between an upper rest position and a lower toasting position and at least one heating element located in the toasting chamber. The safety shut-off device comprises a switch movable between a closed position to thereby energize the at least one heating element and an open position for deenergizing the at least one heating element. A rotatable support beam is pivotally connected to the chassis for pivotal movement between a first pivot position wherein the rotatable support beam moves the switch to the closed position and a second pivot position wherein the switch is in the open position. An armature is connected at a first end of the rotatable support beam for pivotal movement therewith between the first and second pivot positions. A first locking member is connected at a second end of the rotatable support beam opposite the first end for pivotal movement therewith between the first and second pivot positions. A second locking member is adapted for movement with the food support rod and is engageable with the first locking member in the lower toasting position for holding the food support rod in the lower toasting position. An electromagnet is fixedly positioned with respect to the armature for engaging and holding the armature when energized and releasing the armature when deenergized to thereby hold and release the food support in the lower toasting position. With this arrangement, the first and second locking members interengage and the rotatable support beam is pivoted toward the first pivot position when the food support member is moved toward the lower toasting position to thereby close the switch and energize the at least one heating element. Upon energization of the electromagnet, the food support member is held against movement in the lower toasting position. Upon deenergization of the electromagnet, the rotatable support beam pivots to the second pivot position to disengage the first and second locking members and open the switch to deenergize the at least one heating element independent of movement or non-movement of the food support member.

BRIEF DESCRIPTION OF THE SEVERAL VIEWS OF THE DRAWINGS

The preferred embodiments of the present invention will hereinafter be described in conjunction with the appended drawings, wherein.

The invention will now be described in greater detail with reference to the drawings, wherein like parts throughout the drawing figures are represented by like numerals.

DETAILED DESCRIPTION OF THE INVENTION

Figure 1:
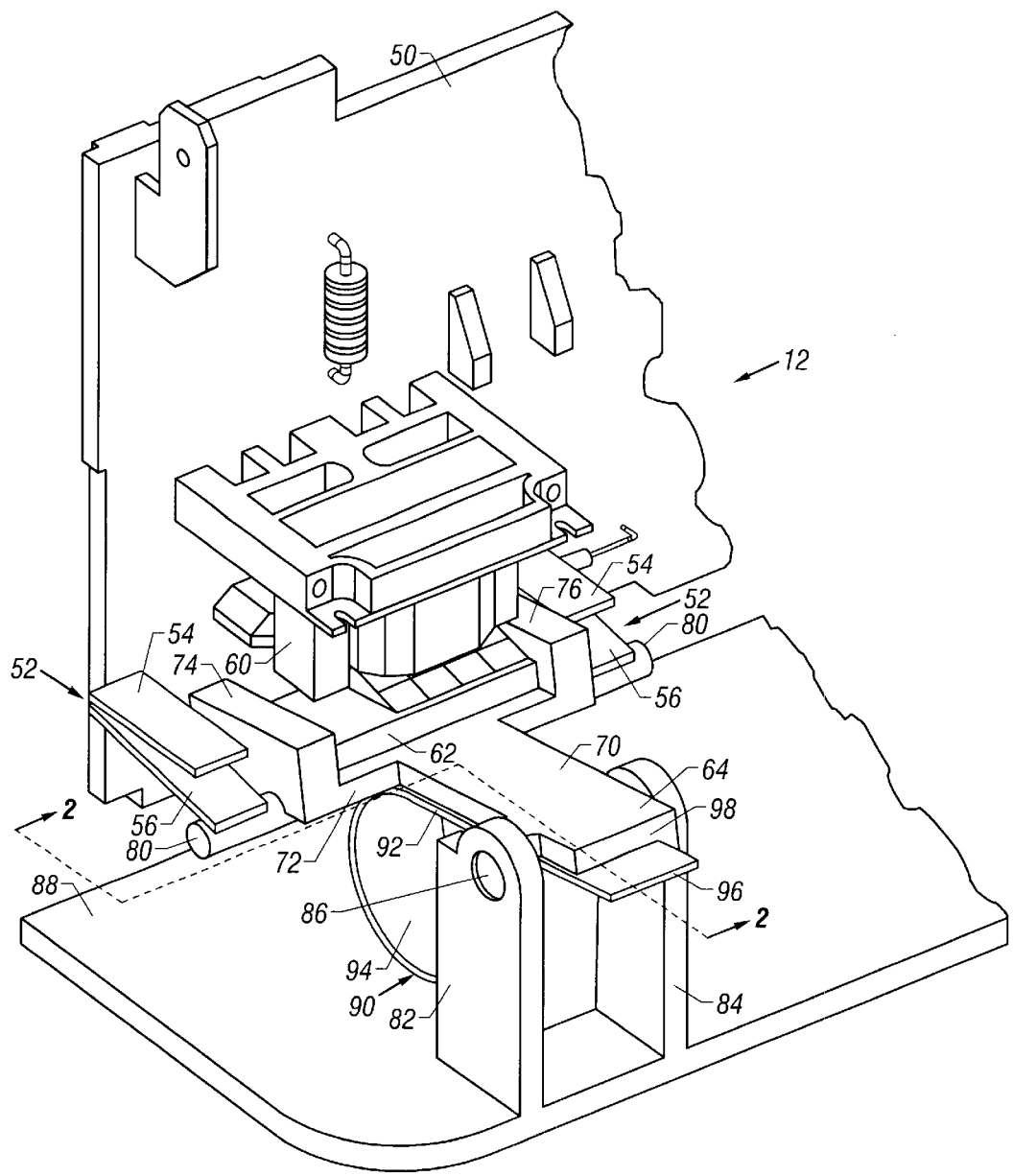
FIG. 1 is an isometric view of a toaster safety device according to the present invention.
Figure 2:
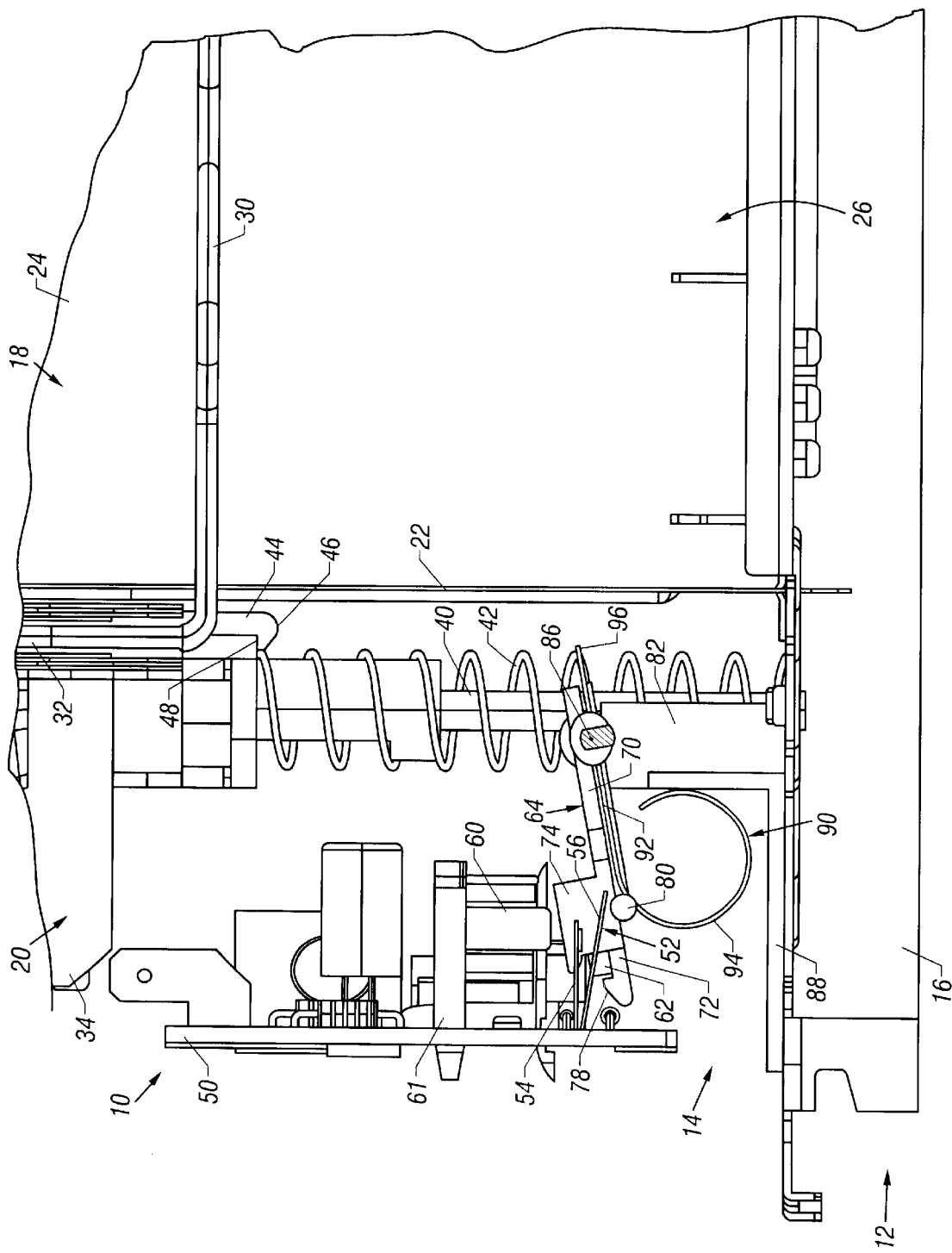
FIG. 2 is a side elevational view of the safety device of FIG. 1 mounted to a toaster chassis according to the present invention, with a bread support assembly of the toaster chassis in a rest or non-operational position.

Referring now to the drawings, and to FIGS. 1 and 2 in particular, a toaster 10 according to the present invention includes a toaster chassis 12 and a safety device 14 connected to the toaster chassis. The toaster chassis 12 has a base 16 with a toasting section 18 and a control section 20 for operating the toasting section. Well-known portions of the toasting section and control section have been left out for clarity.

The toasting section 18 has opposite end walls 22 (only one of which is shown) that are connected to the base 16 and extend upwardly therefrom. One of the end walls 22 divides the toasting section 18 from the control section 20. Side heating element cards 24 (only one of which is shown) preferably extend from the base 16 and between the end walls to form a toasting compartment 26. The heating element cards 24 are of well-known construction and include heating elements (not shown) for toasting food items in a well-known manner.

Figure 3:
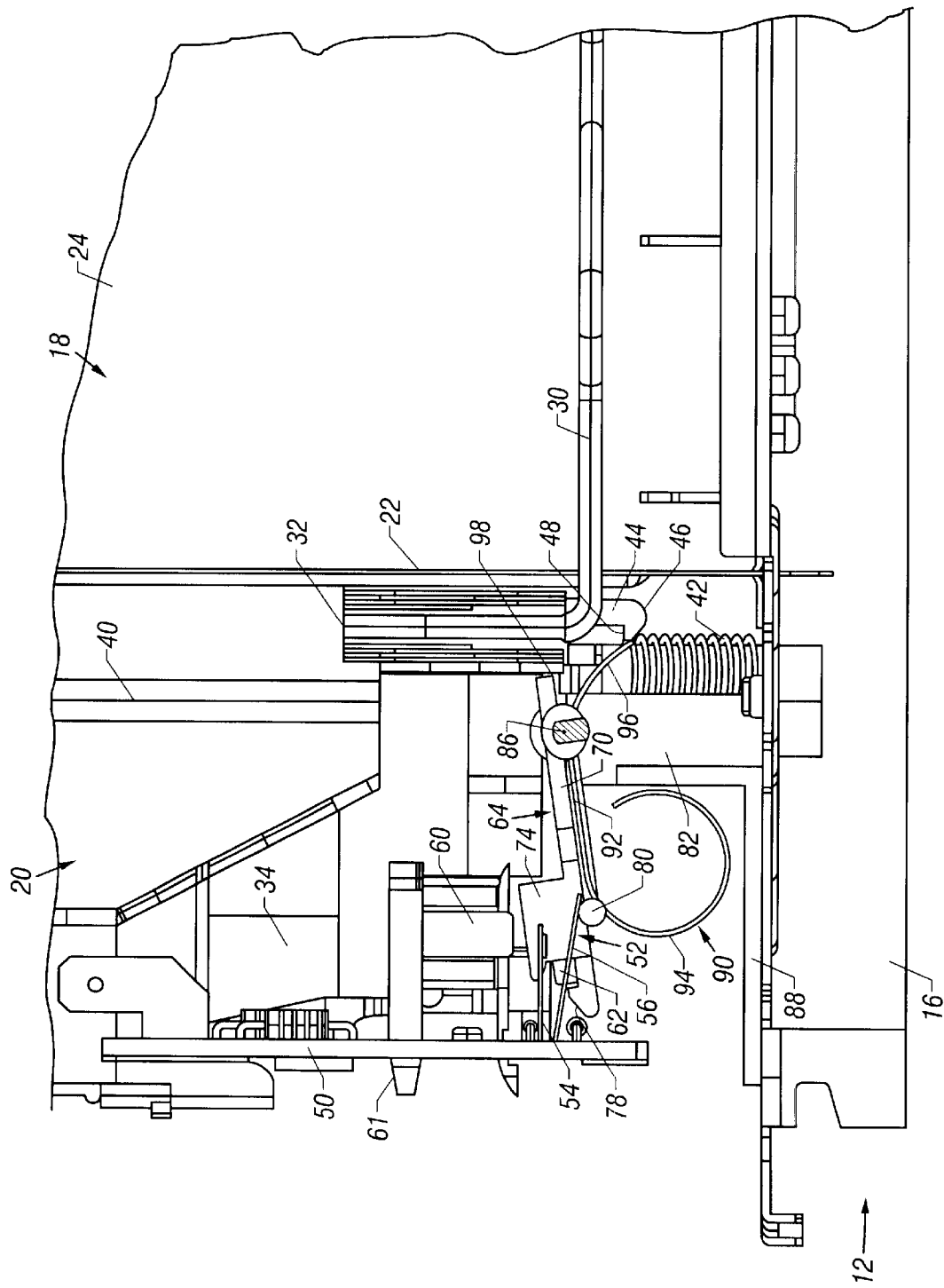
FIG. 3 is a side elevational view similar to FIG. 2 of the safety device and bread support assembly approaching an operational position.

A food support rod 30 extends through a generally vertically oriented slot (not shown) in the end wall 22. A forward end 32 of the support rod 30 is connected to a carriage bracket 34 that is in turn connected to a user-manipulated operating knob (not shown) for sliding the support rod 30 between an upper-most position (FIG. 2) and a lower-most position (FIG. 3). The carriage rod 30 may be accordion-shaped to support bread or other food items thereon. Although only a single compartment 26 and support rod 30 are shown for clarity, it is to be understood that multiple compartments and support rods can be provided for simultaneously toasting multiple food items.

As shown in FIG. 2, the control section 20 includes a guide rod 40 that is mounted to the base 16 and extends upwardly therefrom. The carriage bracket 34 has an opening (not shown) that receives and holds the guide rod 40. A compression spring 42 is installed on the guide rod 40 and extends between the base 16 and the carriage bracket 34. The spring 42 normally biases the carriage bracket 34, and thus the support rod 30, to its upper-most position. A hook 44 is connected to the carriage bracket 34 and extends downwardly therefrom. The hook 44 includes a curved lower edge 46 and a generally flat upper edge 48, the use of which will be described in greater detail below.

The safety device 14 is located in the control section 20 and includes cooperative components mounted on a printed circuit board 50 and on the base 16. The circuit board 50 is preferably connected to the chassis 12 in a generally vertical orientation in a well-known manner. Spaced contact switches 52 are mounted to the circuit board 50 in cantilevered fashion. Each switch 52 has an upper contact finger 54 that extends generally horizontally and a lower contact finger 56 that extends generally downwardly and at an acute angle with respect to the upper contact finger. Preferably, the upper contact finger 54 is stationary while the lower contact finger 56 can flex or otherwise move into contact with the upper contact finger to complete an electrical circuit, and move away from the upper contact finger to break the electrical circuit. An electromagnet 60 is mounted to the circuit board 50 through a mounting bracket 61 and is energized when the switches 52 are closed during a toasting operation.

An armature 62 is mounted in an armature carrier 64 and is adapted to contact and be held by the electromagnet 60 when energized to thereby hold the support rod 30 in its lower-most position during the toasting operation. Although not shown, well-known means for de-energizing the electromagnet and completing the toasting operation may be provided in conjunction with a manually settable knob for adjusting the toasted color of the bread or other food item.

The armature carrier 64 is preferably T-shaped in configuration and includes a first beam 70 and a second beam 72 that is connected to a forward end of the first beam and extends transverse thereto. The second beam 72 includes a pair of end walls 74, 76 and a forward projection 78, with the armature 62 located therebetween. A contact pin 80 is mounted to a bottom of the second beam 72 and extends laterally beyond the end walls 74, 76 for contacting the lower contact fingers 56 of the switches 52. A rearward end of the first beam 70 is pivotally connected to a pair of spaced legs 82, 84 through a pivot pin 86 that extends through the legs. The pivot pin can be securely connected to the first beam 70 and rotate in the legs 82 and 84. Alternatively, the pivot pin can be stationary with respect to the legs with the first beam 70 pivotally connected to the pivot pin. The legs 82, 84 extend upwardly from a platform 88 which is in turn securely connected to the base 16. A leaf spring 90 has a relatively flat section 92 that is connected to the underside of the first beam 70 and a curved section 94 that normally rests against the legs 82, 84 when the support rod 30 is in its upper-most position, as shown in FIG. 2. A rearward end of the leaf spring 90 extends rearwardly of a rearward end 98 of the first beam 70 and forms a cantilevered catch 96, as will be described in greater detail below. The off-centered position of the pivot pin with respect to the first beam 70, together with the combined weight of the first beam 70 forward of the pivot pin, the second beam 72, the contact pin 80, the armature 62, and the leaf spring 90 ensure that the armature carrier 64 is normally tilted out of contact with the switches $5^2$ and electromagnet 60 in a non-use or safety position, as will be described in greater detail below.

With reference to FIGS. 2–6, operation of the toaster 10 will now be described. A food item (not shown), such as a slice of bread, is inserted into one or more of the compartments 26 so as to rest on one or more of the support rods 30. The operating knob (not shown) is then pressed downwardly to lower the carriage bracket 34 and the support rod 30. Continuous downward movement of the carriage bracket 34 causes the lower curved edge 46 of the hook 44 to contact and flex the catch 96 of the leaf spring 90, and rotate the armature carrier 64 about the pivot pin 86 in a clockwise direction so that the contact pin 80 touches the lower contact fingers 56, as shown in FIG. 3. Further downward movement of the carriage bracket 34 causes the catch 96 to clear the hook 44 and snap back to its original position with respect to the first beam 70 and to rotate the contact pin 80 in the clockwise direction and move the lower contact fingers 56 toward their respective upper contact fingers 54 until the armature 62 is in contact with the electromagnet 60 and the lower contact fingers engage the upper contact fingers. At that moment, electrical current passes through the contact fingers 54, 56 and into an electrical circuit (not shown) to preferably energize the electromagnet 60 and hold the armature 62 and the armature carrier 64 against movement, as well as energize the heating elements (not shown). Preferably, the catch 96 snaps back to its original position with respect to the beam 70 either simultaneously with or prior to engagement of the lower contact fingers with the upper contact fingers so that the heating elements are energized only when the carriage bracket 34 is locked in the lower toasting position.

Figure 4:
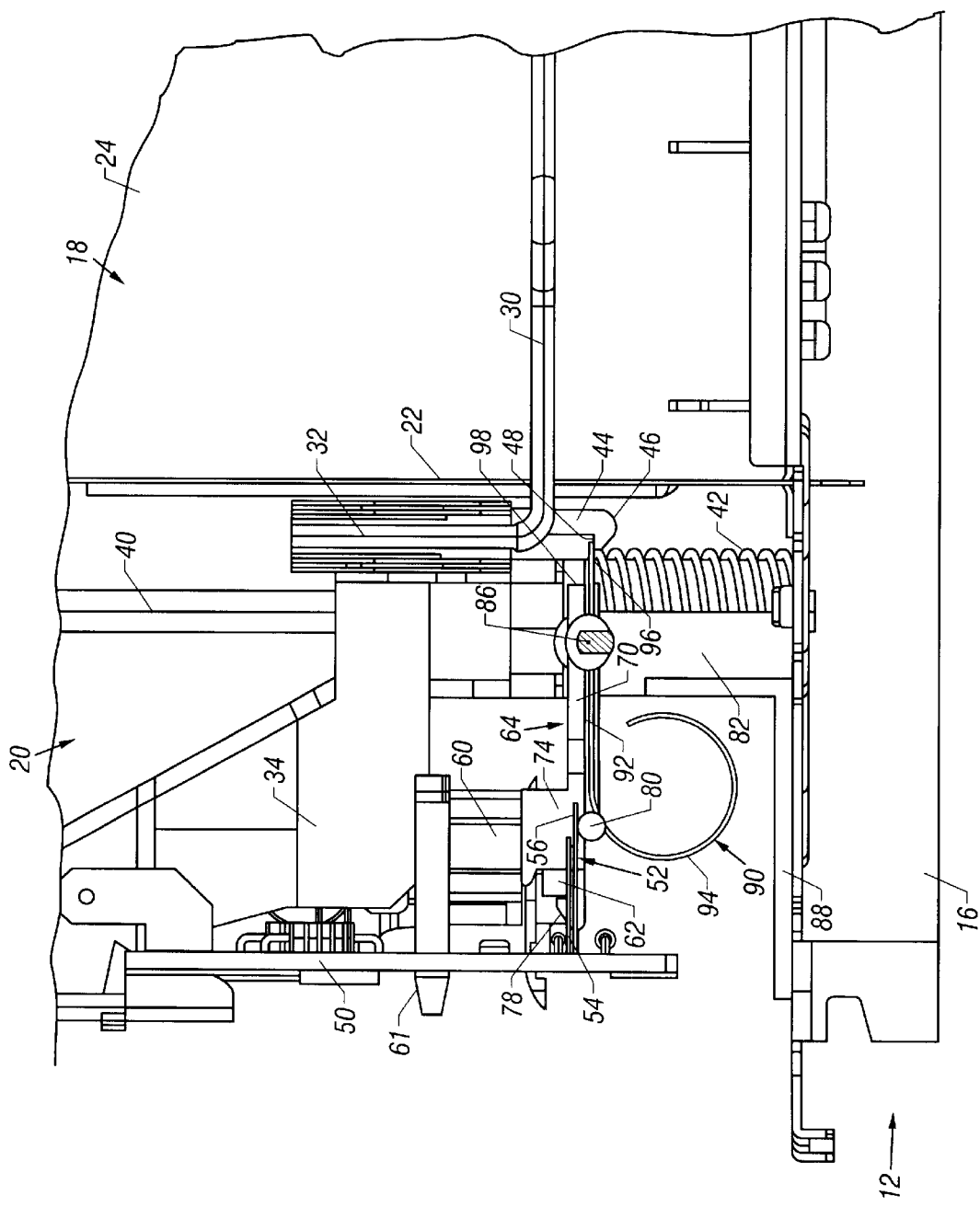
FIG. 4 is a side elevational view of the safety device and bread support assembly in the operational position.
Figure 5:
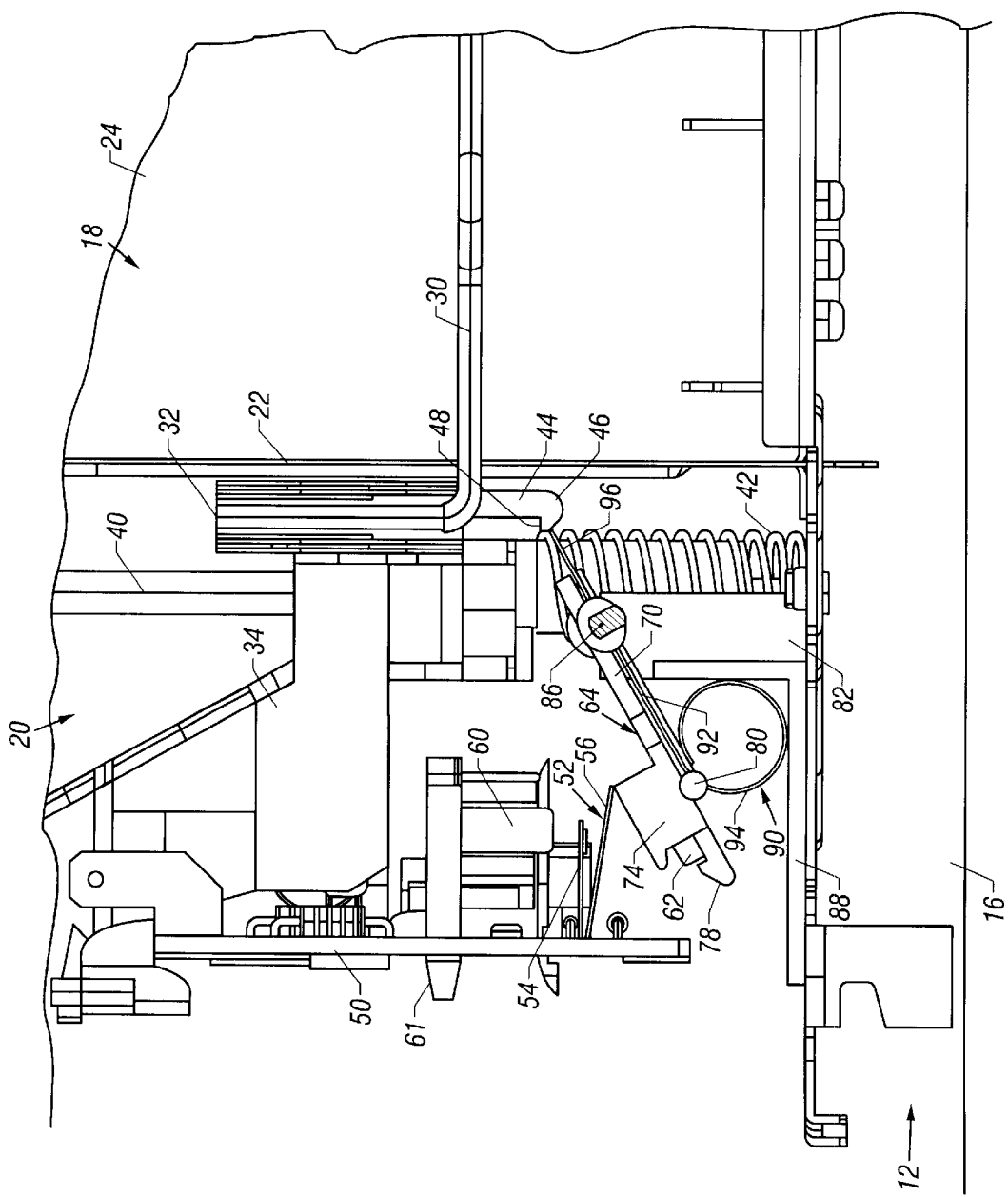
FIG. 5 is a side elevational view of the safety device and bread support assembly in a shut-off position.

As shown in FIG. 4, when the carriage bracket 34 is released by a user, it will move upwardly under bias from the compression spring 42 until the flat upper edge 48 of the hook 44 rests against a bottom surface of the catch 96, to thereby lock the carriage bracket 34 in the lower toasting position. The catch 96 prevents the carriage bracket 34 from returning to its upper rest position under bias of the compression spring 42. The catch 96 of the leaf spring 90 is preferably unsupported by the first beam 70 when flexed in the downward direction (FIG. 3) for permitting the hook 44, and thus the support rod 30, to descend below the catch, and is preferably supported by the first beam 70 against flexure to hold the hook 44, and thus the support rod 30, in the lower toasting position (FIG. 4).

After a preset time period, which can be set by the electrical circuit (not shown) and/or user input, current to the electromagnet 60 is turned off. As a result, the armature 62 and armature carrier 64 rotate counterclockwise, as shown FIG. 5, about the pivot pin 6 due to gravitational force, as well as the upward force exerted on the catch 96 by the hook 44 under bias from the compression spring 42. In order for the carriage bracket 34 to completely pass the leaf spring 90 during upward movement, the curved section 94 of the leaf spring 90 flexes against the legs 82, 84 and the platform 88 to move the hook 44 out of engagement with the catch 96. The bias force of the compression spring 42 is preferably strong enough to cause the curved section 94 to flex a sufficient amount so that the hook 44 can clear the catch 96.

Figure 6:
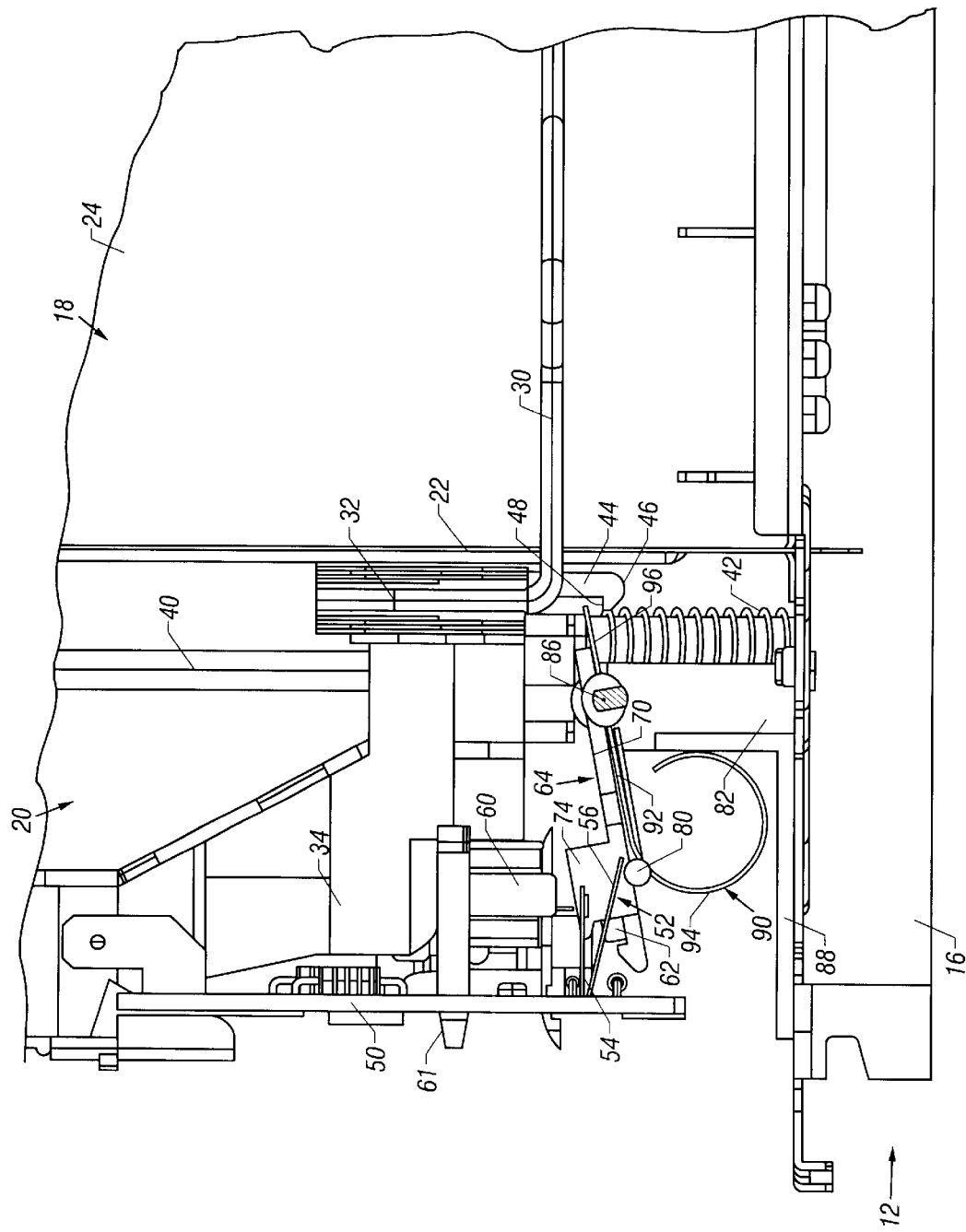
FIG. 6 is a side elevational view of the safety device and bread support assembly in a safety shut-off position.

With reference now to FIG. 6, in the event that a food item in the compartment 26 becomes lodged and prevents upward movement of the food support 30, the safety device 14 prevents continued operation of the toaster 10. As shown, the carriage bracket 34 is stuck in a toasting position. When the electromagnet 60 is turned off after a toasting operation, the armature 62, armature carrier 64, and leaf spring 90 rotate in the counterclockwise direction as viewed in FIG. 6 under gravitational forces, and independent of movement or non-movement of the carriage bracket 34. Rotation of the armature carrier 64 in this manner opens the switches 52 and turns off power to the heating elements (not shown) associated with the heating element cards 24. In this manner, the toasting operation will stop even when the food support rod 30 is prevented from moving upward due to a food jam.

The above-described arrangement not only prevents continued operation of the toaster in the even of a food jam, but also prevents re-initialization of the toasting cycle until the jam is cleared since the beam cannot be rotated to close the switch and the armature 62 cannot contact the electromagnet 60 without the hook 44 moving above the catch 96.

It will be understood that the terms forward, rearward, upper, lower, lateral, and their respective derivatives and equivalent terms as may be used throughout the specification refer to relative, rather than absolute positions and/or orientations.

While the invention has been taught with specific reference to the above-described embodiments, those skilled in the art will recognize that changes can be made in form and detail without departing from the spirit and the scope of the invention. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An electric toaster comprising:

a chassis having at least one toasting compartment;

at least one heating element located in the compartment;

a food support member positioned in the compartment for supporting a food item, the food support member being biased toward an upper rest position and being movable between a lower toasting position and the upper rest position;

an electromagnet connected to the chassis for holding the food support member in the lower toasting position when energized;

at least one switch movable between a closed position to thereby energize the at least one heating element and an open position for deenergizing the at least one heating element;

a rotatable support beam pivotally connected to the chassis for pivotal movement between a first pivot position wherein the rotatable support beam moves the switch to the closed position and a second pivot position wherein the switch is in the open position;

an armature connected at a first end of the rotatable support beam for pivotal movement therewith between the first and second pivot positions, the armature being held by the electromagnet in the first pivot position when the electromagnet is energized and being separated from the electromagnet in the second pivot position when the electromagnet is deenergized;

a first locking member at a second end of the rotatable support beam opposite the first end; and a second locking member operably connected to the food support member for movement therewith;

wherein the first and second locking members interengage and the rotatable support beam is pivoted toward the first pivot position when the food support member is moved toward the lower toasting position thereby closing the switch and energizing the at least one heating element and, upon energization of the electromagnet, holding the food support member against movement in the lower toasting position.

2. An electric toaster according to claim 1, wherein deenergization of the electromagnet causes the rotatable support beam to pivot to the second pivot position to disengage the first and second locking members and open the switch to deenergize the at least one heating element independent of movement or non-movement of the food support member.

3. An electric toaster according to claim 2, wherein the first locking member comprises a catch that extends beyond the second end of the rotatable support beam.

4. An electric toaster according to claim 3, wherein the second locking member comprises a hook that engages the catch when the food support member is in the lower toasting position to thereby prevent movement of the food support member toward the upper rest position when the electromagnet is energized.

5. An electric toaster according to claim 4, wherein the catch is constructed of a flexible material.

6. An electrical toaster according to claim 5, wherein the catch is supported by the rotatable support beam against flexure in one direction to thereby stop movement of the hook toward the upper rest position, and is free to flex away from the rotatable support beam during movement of the hook toward the lower toasting position.

7. An electric toaster according to claim 6, and further comprising a leaf spring connected to the rotatable support member, the leaf spring including a first ring-shaped portion and a second portion that comprises the catch.

8. An electric toaster according to claim 7, wherein movement of the hook toward the upper rest position causes the ring-shaped portion to flex against a surface of the chassis adjacent the ring-shaped portion so that the hook can move past the catch during hook movement toward the upper rest position.

9. An electric toaster according to claim 8, and further comprising:
 a carriage bracket connected to the food support member for movement therewith; and
 a compression spring extending between the chassis and the carriage bracket for biasing the food support member toward the upper rest position.

10. An electric toaster according to claim 9, wherein a bias force of the compression spring is greater than a bias force of the ring-shaped portion of the leaf spring.

11. An electric toaster according to claim 2, wherein the rotatable support beam pivots from the first pivot position to the second pivot position under gravity.

12. An electric toaster according to claim 11, wherein the rotational support beam pivots about a pivot point that is located between a center of the rotational support beam and the second end.

13. An electric toaster according to claim 1, wherein the rotational support beam pivots about a pivot point that is located between a center of the rotational support beam and the second end.

14. An electric toaster according to claim 1, wherein the at least one switch comprises:
 a pair of spaced contact fingers, one of the contact fingers being relatively movable with respect to the other contact finger between the closed position where the fingers are in contact with each other to thereby energize the at least one heating element, and the open position where the fingers are spaced from each other for deenergizing the at least one heating element, the rotatable support beam being operably engageable with the one contact finger to move the one contact finger to the closed position when the rotatable support beam is pivoted toward the first pivot position and permitting movement of the one contact finger to the open position when the rotatable support beam is pivoted toward the second pivot position.

15. An electric toaster according to claim 14, and further comprising a circuit board supported by the chassis adjacent the first end of the rotatable support beam, with the spaced fingers extending from the circuit board in cantilevered fashion.

16. A safety shut-off device for an electric toaster having a food support rod movable in a toasting chamber between an upper rest position and a lower toasting position and at least one heating element located in the toasting chamber, the safety shut-off device comprising:
 a switch movable between a closed position to thereby energize the at least one heating element and an open position for deenergizing the at least one heating element
 a rotatable support beam pivotally connected to the chassis for pivotal movement between a first pivot position wherein the rotatable support beam moves the switch into the closed position and a second pivot position wherein the switch is in the open position;
 an armature connected at a first end of the rotatable support beam for pivotal movement therewith between the first and second pivot positions;
 a first locking member connected at a second end of the rotatable support beam opposite the first end for pivotal movement therewith between the first and second pivot positions;
 a second locking member adapted for movement with the food support rod and engageable with the first locking member in the lower toasting position for holding the food support rod in the lower toasting position;
 an electromagnet fixedly positioned with respect to the armature for engaging and holding the armature when energized and releasing the armature when deenergized to thereby hold and release the food support in the lower toasting position;
 wherein the first and second locking members interengage and the rotatable support beam is pivoted toward the first pivot position when the food support member is moved toward the lower toasting position to thereby close the switch and energize the at least one heating element and, upon energization of the electromagnet, holding the food support member against movement in the lower toasting position.

17. A safety shut-off device according to claim 16, wherein deenergization of the electromagnet causes the rotatable support beam to pivot to the second pivot position to disengage the first and second locking members and open the switch to deenergize the at least one heating element independent of movement or non-movement of the food support member.

18. A safety shut-off device according to claim 17, wherein the first locking member comprises a catch that extends beyond the second end of the rotatable support beam.

19. A safety shut-off device according to claim 18, wherein the second locking member comprises a hook that engages the catch when the food support member is in the lower toasting position to thereby prevent movement of the food support member toward the upper rest position when the electromagnet is energized.

20. A safety shut-off device according to claim 19, wherein the catch is constructed of a flexible material.

21. A safety shut-off device according to claim 20, wherein the catch is supported by the rotatable support beam against flexure in one direction to thereby stop movement of the hook toward the upper rest position, and is free to flex away from the rotatable support beam during movement of the hook toward the lower toasting position.

22. A safety shut-off device according to claim 21, and further comprising a leaf spring connected to the rotatable support member, the leaf spring including a first ring-shaped portion and a second portion that comprises the catch.

23. A safety shut-off device according to claim 22, wherein movement of the hook toward the upper rest position causes the ring-shaped portion to flex so that the hook can move past the catch during hook movement toward the upper rest position.

24. A safety shut-off device according to claim 17, wherein the rotatable support beam pivots from the first pivot position to the second pivot position under gravity.

25. A safety shut-off device according to claim 24, wherein the rotational support beam pivots about a pivot point that is located between a center of the rotational support beam and the second end.

26. A safety shut-off device according to claim 16, wherein the rotational support beam pivots about a pivot point that is located between a center of the rotational support beam and the second end.

27. A safety shut-off device according to claim 16, wherein the at least one switch comprises:

a pair of spaced contact fingers, one of the contact fingers being relatively movable with respect to the other contact finger between the closed position where the fingers are in contact with each other to thereby energize the at least one heating element, and the open position where the fingers are spaced from each other for deenergizing the at least one heating element, the rotatable support beam being operably engageable with the one contact finger to move the one contact finger to the closed position when the rotatable support beam is pivoted toward the first pivot position and permitting movement of the one contact finger to the open position when the rotatable support beam is pivoted toward the second pivot position.

28. A safety shut-off device according to claim 27, and further comprising a circuit board supported by the chassis adjacent the first end of the rotatable support beam, with the spaced fingers extending from the circuit board in cantilevered fashion.

* * * * *